United States Patent [19]

Nishijima et al.

[11] Patent Number: 5,579,195
[45] Date of Patent: Nov. 26, 1996

[54] POWER STOPPAGE MINIMIZING SYSTEMS FOR DISTRIBUTION LINES AND METHODS OF USING A DISTRIBUTION LINE

[75] Inventors: Kazuo Nishijima, Katsuta; Hiroshi Inoue, Hitachi; Minoru Kanoi; Terunobu Miyazaki, both of Ibaraki-ken; Mitsuru Nakamura, Katsuta, all of Japan

[73] Assignee: Hitachi, Ltd., Tokyo, Japan

[21] Appl. No.: 207,664

[22] Filed: Mar. 9, 1994

[30] Foreign Application Priority Data

Mar. 12, 1993 [JP] Japan ................................. 5-051611

[51] Int. Cl.$^6$ ........................................................ H02H 3/00
[52] U.S. Cl. ............................... 361/62; 361/64; 361/66; 361/93; 361/115
[58] Field of Search ............................... 361/62, 64, 66, 361/93, 115, 42, 71, 72

[56] References Cited

U.S. PATENT DOCUMENTS 3,909,677  9/1975  McClain .................................. 361/62

OTHER PUBLICATIONS

Comprehensive Power Supply Technique Manual published by Ohm, Nov. 30, 1991, pp. 464–465.

Primary Examiner—Fritz M. Fleming
Assistant Examiner—Stephen W. Jackson
Attorney, Agent, or Firm—Fay, Sharpe, Beall, Fagan, Minnich & McKee

[57] ABSTRACT

A power stoppage minimizing system for a distribution line and a method of using a distribution line minimize a power stoppage section and a power stoppage time when a short circuit occurs in the distribution line, and employs a first and a second distribution line each connected through a circuit breaker to a corresponding bus and each having switches in position thereon; a normally open tie point switchgear provided between adjacent ends of the first and second distribution lines; a protective relay for opening, when a short circuit has occurred, the circuit breaker a fixed time after the occurrence of the short circuit on the first distribution line; a first unit for opening a switch on the side of a power source and nearest a point where the short circuit has occurred; a second unit for opening, after the switch is opened by the first unit, a switch on the side of a load nearest the switch opened by the first unit; and a third unit for closing the tie point switchgear after the opening of the switch by the second unit, the opening of the switch by the first unit being made within a fixed interval of time for the protective relay. Thus, the short circuit section is located and the switches before and after the short circuit section are opened. The tie point switchgear is then closed to thereby minimize the power stoppage section and time when the short circuit has occurred.

4 Claims, 5 Drawing Sheets

POWER STOPPAGE MINIMIZING SYSTEMS FOR DISTRIBUTION LINES AND METHODS OF USING A DISTRIBUTION LINE

BACKGROUND OF THE INVENTION

The present invention relates to power stoppage minimizing systems for distribution lines and methods of using the distribution lines, and more particularly to a power stoppage minimizing system for a distribution line and a method of using the distribution line which minimize a power stoppage section and power stoppage time when a short-circuit accident occurs in the distribution line.

A disconnection of a distribution line is another possible accident that can be handled, by maintaining healthy sections under supply of power, and by specifying and cutting away the disconnection section as in the power stoppage minimizing system which copes with the short circuit.

Conventionally, the distribution line is used such that an accident occurring in the distribution line is removed in a time-limit sequential feed protective system which is disclosed, for example, in "COMPREHENSIVE POWER SUPPLY TECHNIQUE MANUAL", published by Ohm, Nov. 30, 1991, pp. 464–465.

That system is provided with a section switch, a time-limit sequential feed unit and a power supply transformer at each section point on the distribution line. When an accident occurs on the distribution line, a protective relay installed in a substation is operated to interrupt a circuit breaker connected to a distribution bus to open the switch connected to the distribution line that has zero voltage, and then re-closes the circuit breaker. This causes the switch on the distribution line at a position nearest the circuit breaker to be impressed with a voltage to thereby be re-closed. This causes the next switch to be impressed with a voltage to thereby be re-closed. This operation is iterated until the end switch is re-closed. When an accident occurring on the distribution line is of a recoverable type, the opening of the circuit breaker eliminates the accident and the operation continues thereafter. If the accident is of a permanent type where a short circuit continues due to breakage of devices connected to the distribution line, the circuit breaker is re-opened and power is thereafter supplied up to the switch at the position of occurrence of that accident and no power is supplied to the subsequent line and devices. In such a case, the normal state of the system is recovered by eliminating the cause of the accident manually.

The problem with the conventional time-limit sequential feed protective system, as just mentioned above, is that a power stoppage of about 30–60 seconds occurs due to the opening of the circuit breaker. The recent spread of computer systems does not permit the occurrence of a power stoppage in the distribution line, so that a distribution line power stoppage minimizing system is desired which minimizes a power stoppage section and power stoppage time.

Although minimization of the power stoppage section and time is naturally required also in the case of a short circuit accident, the progress of a deterioration in the power supply equipment including distribution lines, switches, transformers, etc., of the distribution equipment due to stresses, that is, due to a rise in the temperature of those devices caused by the flow of an overcurrent through those devices is great in the case of a short circuit accident in the distribution line. Thus, the power stoppage time permitted from the occurrence of an accident to its elimination is about 0.2 seconds and other power stoppage sections must not exist in the distribution line.

SUMMARY OF THE INVENTION

It is a main object of the present invention to provide a distribution line power stoppage minimizing system and distribution line using method which minimizes a power stoppage section and time.

In order to achieve the above object, according to the present invention, there is provided a power stoppage minimizing system for a distribution line, including:

a first and a second distribution line each connected through a circuit breaker to a corresponding bus and having switches in position thereon;

a normally open tie point switchgear provided between adjacent ends of said first and second distribution lines;

a protective relay for opening, when a short circuit has occurred, the circuit breaker a fixed time after the occurrence of the short circuit on the first distribution line;

first means for opening a switch on the side of a power source and nearest a point where the short circuit has occurred;

second means for opening, after the switch is opened by the first means, a switch on the side of a load nearest the switch opened by said first means; and third means for closing the tie point switchgear after the opening of the switch by said second means, the opening of the switch by the first means being made within a fixed interval of time for the protective relay.

According to the present invention, since a short circuit section is located, switches present before and after that section are opened, and a tie point switchgear is then closed, whereby the power stoppage section and time due to the short circuit are minimized.

BRIEF DESCRIPTION OF THE DRAWINGS

Preferred embodiments of the present invention will now be described in conjunction with the accompanying drawings, in which.

DESCRIPTION OF THE PREFERRED EMBODIMENTS

Figure 1:
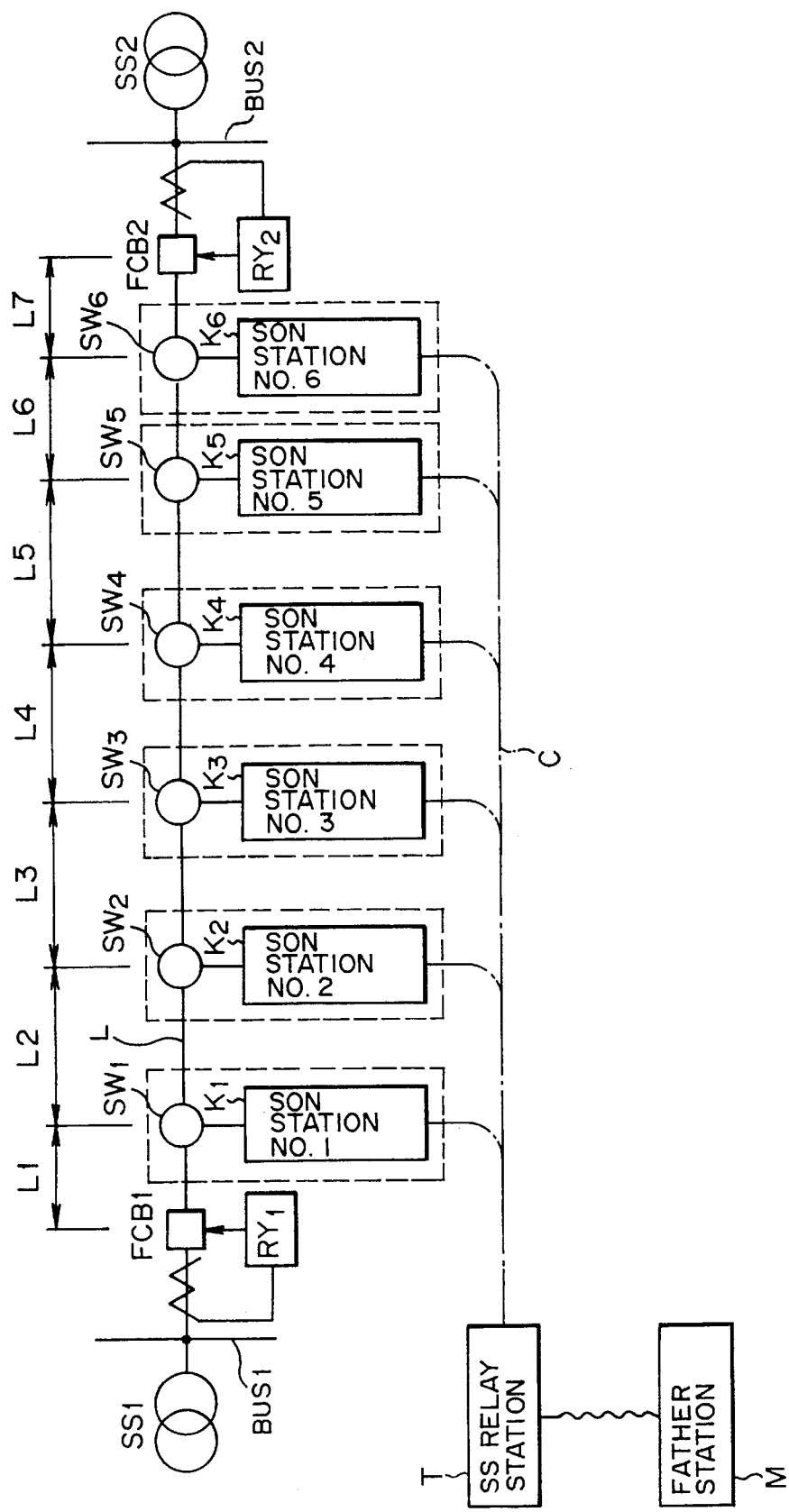
FIG. 1 shows a power supply system and device structure to which the present invention is applied.

FIG. 1 shows a power distribution system to which the present invention is applied. A distribution line L is connected through a feeder circuit breaker FCB to a bus BUS of a substation SS with switches SW1–SW6 being provided in position on the distribution line L. All the switches except the switch SW6 are in a closed state, so that the line sections L1–L6 are supplied with power from the BUS1 and the line section L7 is supplied with power from the BUS2. The line sections supplied with power from the bus BUS1 are hereinafter referred to as first feeder line sections, while the line sections supplied with power from the BUS2 are hereinafter referred to as second feeder line sections. The position of the normally open switch SW6 is referred to as a tie point and the switch SW6 present at that position is referred to as a normally open point switchgear.

Each circuit breaker FCB is provided with a protective relay RY which is set so as to open the breaker FCB, for example, within 0.2 seconds after detection of a short circuit in the distribution line L. The switches SW1–SW6 and corresponding son stations K1–K6 are provided on an upstanding pole and are connected to each other by a signal line C and to a father station M through a relay station T.

The detected outputs from the protective relays 51 (FIG. 2) of the respective son stations K and on/off state signals from the switches are sent to the father station M, which in turn sends a son station state monitoring request, a switch controlling request, etc., to the son stations k.

Figure 2:
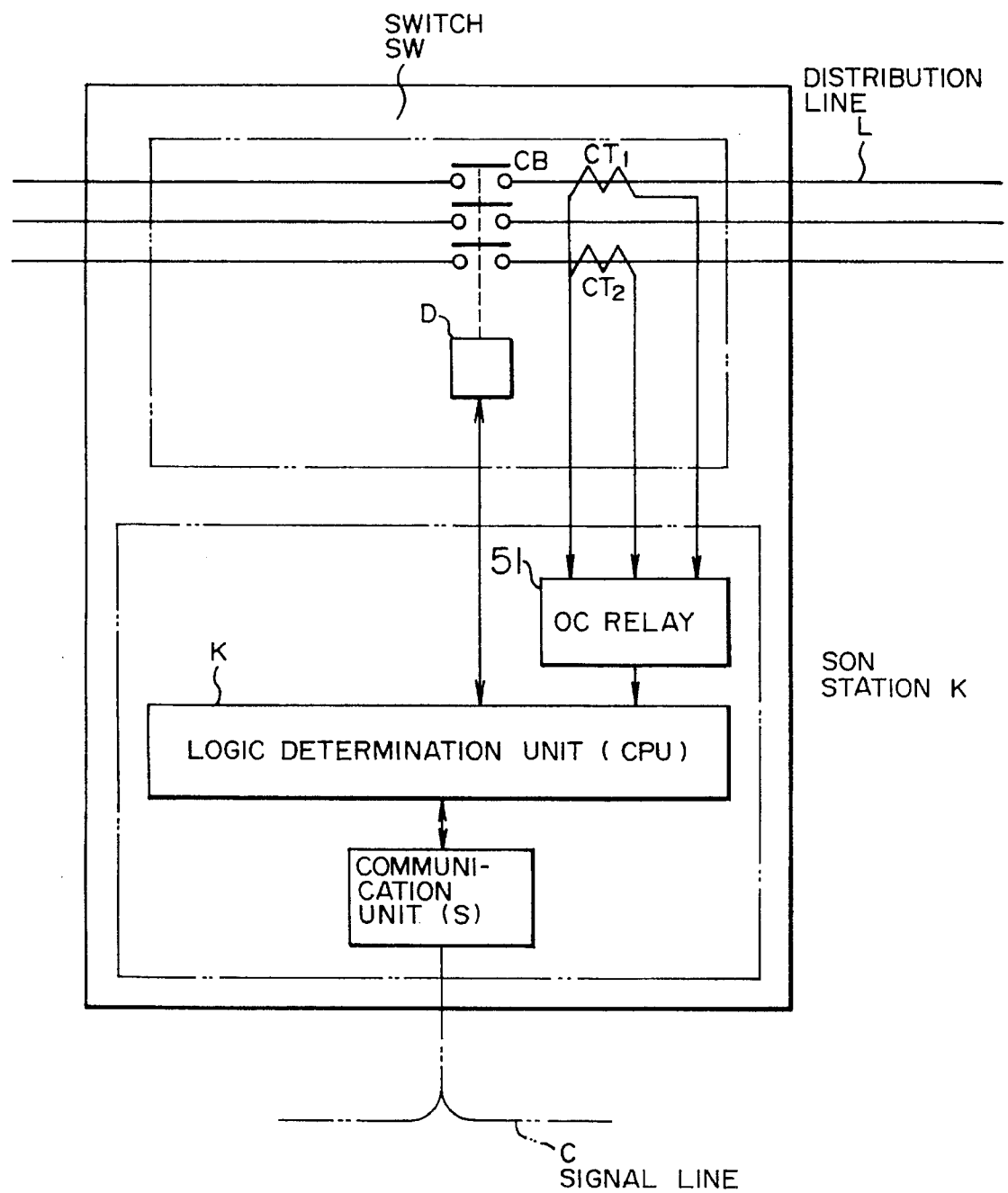
FIG. 2 shows the structure of a switch Sw and a son station k of FIG. 1.

FIG. 2 shows an illustrative son station k and an illustrative switch SW of in FIG. 1. The switch SW is provided with contacts CB, current transformers CT1, CT2 which detect a short circuit, and a driver D for the contacts CB. The son station K is provided with a short-circuit detection protective relay (overcurrent relay) 51 which detects a short circuit on the basis of detection current signals from the transformers CT1 and CT2, a logic determination unit CPU and a communication unit S.

Figure 3:
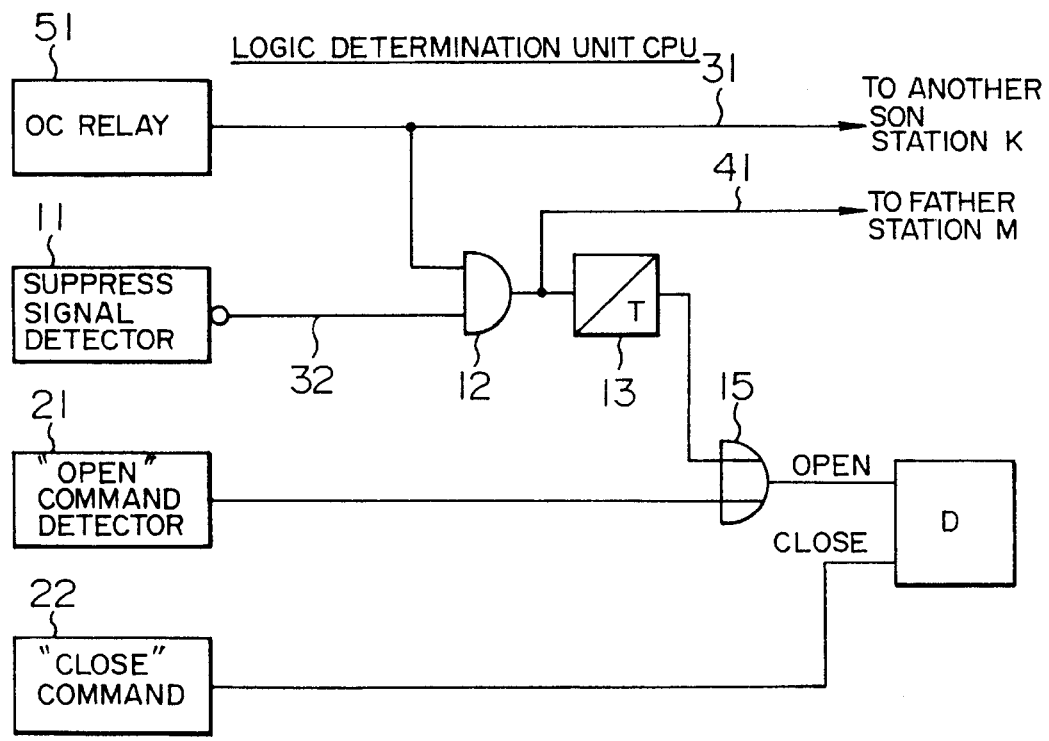
FIG. 3 shows one embodiment of the son station k of FIG. 1.

FIG. 3 shows a logic of the logic determination unit CPU of a son station K of FIG. 1. In FIG. 3, reference numeral 12 denotes an AND gate; 11 a suppression signal detector; 13 a time delay unit; and 15 an OR gate. In operation, assume that a short circuit F has occurred on the distribution line L3 in FIG. 1. Both the overcurrent relays 51 of the son stations K1, K2 positioned on the side of the power source from the accident point detect the short circuit and output signals 31 indicative of that accident, which are delivered through the signal line C from the communication units S of the son stations to more upstream son stations (those nearer the BUS). Thus, the more upstream son station K1 detects in its suppression signal detector 11 a signal 31 from the less upstream son station K2 through its communication unit S.

The signal 32 is applied as a negative signal to the AND gate 12 such that when the more downstream son station detects a short circuit, the signal 31 inhibits the AND gate 12 from outputting a signal while when the more downstream son station detects no short circuit, it allows the AND gate 12 to output a signal. Thus, as a result, the AND gate 12 of the more upstream son station K1 outputs no signal. Since no overcurrent relays 51 operate in the son stations K3–K6 positioned more downstream of the accident section L3, they deliver no signals 31 to the son station K2. Thus, when an accident F occurs in the distribution line L3, only the more upstream son station K2 nearest the distribution line L3 delivers a signal to the AND gate 12, a signal from which is delivered to the driver D of the contacts CB through the timer 13 and OR gate 15. The signal output from the AND gate 12 is a so-called trip signal which causes the timer 13 to output a signal a predetermined time T after the trip signal is input to the timer to thereby open the switch SW2. The timer 13 is used to inhibit a signal from being output from the AND gate 12 for an interval of time of from the detection the accident by the more upstream son station K1 to the receipt of a signal 32 from the less upstream son station K2.

The output from the AND gate 12 is delivered as a signal 41 with the name Kx of the appropriate son station to the father station M. As will be obvious from the above description, it is only the power source side son station K nearest the accident point that opens the switch SW. Thus, when the father station M receives the signal 41, the accident section is located from the name Kx of the son station.

Figure 4:
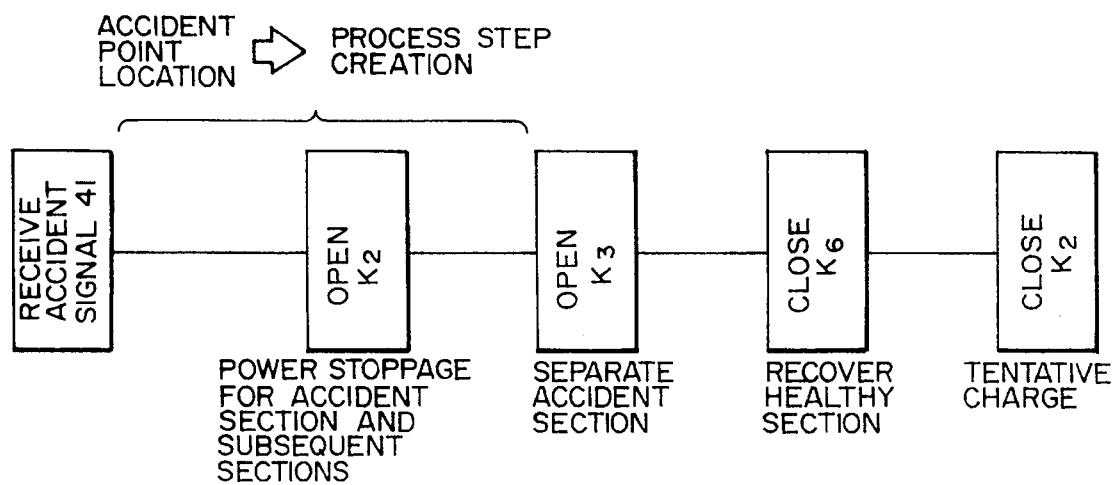
FIG. 4 shows one embodiment of a father station M of FIG. 1.

FIG. 4 shows only the father station's function of coping with a short circuit among various functions such as supervision, display, printer output and management of the whole power supply system of the father station M. First, when the father station M receives the signal 41 from the son station K2, it locates the accident point from the name Kx of the son station K2 and gives a command for the son station K2 to open the switch SW2. More particularly, this command is given to the "open" command detector 21 of the son station K2 of FIG. 3 to thereby open the switch SW2 through the AND gate 21 and the driver D. In the present invention, the time taken for opening the switch SW2 is reduced to sufficiently less than 0.2 seconds by adoption of a communication technique. Thus, the switch SW2 is opened before the feeder circuit breaker FCB is opened by the operation of the protective relay RY1 provided on the service bus BUS1. As a result, the power distribution sections L3–L6 of the first distribution line suffer from a power stoppage. When the switch SW2 is not opened for some reason in a time less than 0.2 seconds, the breaker FCB is opened by the operation of the relay RY1, which implies double protection of the service line.

Subsequently, the father station M also gives a command for the son station K3 nearest the accident section on the opposite side of the power source from the son station K2 to open the switch SW3. More particularly, the "open" command is given to the "open" command detector 21 of the son station K3 of FIG. 3 to open the switch SW3 through the OR gate 21 and the driver D. Furthermore, the father station M gives a command for the son station K6 as the current tie point to close the switch SW6. When the logic determination unit CPU of the son station K6 of FIG. 3 receives a "close" command signal 22, it closes the switch SW6 through the driver D.

The reason why the switch SW3 nearest the switch SW2 on the opposite side of the switch SW2 from the power source is opened before the switch SW6 as the tie point is closed is that many of short circuits are of the permanent type, as mentioned above. That is, it is opened to prevent an accident from occurring on the second distribution line to give an unnecessary impact to the second distribution line when power is supplied from the bus BUS2 to the distribution line, inclusive of the distribution section L3. It takes about 4 seconds from the occurrence of an accident to the closing of the switch SW6 to thereby cause the bus BUS2 to supply power again to the distribution sections L4–L6 which no power has been supplied except to the distribution section L3. The power stoppage time interval of the supply sections L4–L6 is about 0.2–0.3 seconds and minimized.

Although the distribution section L3 is left in a power stoppage by the above process, a short circuit may not be of a permanent type but of a recoverable type, in which case the following recovering step is made by causing the father station M to give a "close" command to the son station K2 which delivered an accident signal 41 to the father station M. When the logic determination unit CPU of the son station K2 of FIG. 3 detects the "close" command in the "close" command detector 22, it closes the switch SW2 through the driver D. If the short circuit has recovered before the closing of the switch SW2, the distribution section L3 is recovered and supplied with power from the BUS1. When this reclosing operation succeeds, the switch SW2 becomes a tie point thereafter. When the short circuit is of the permanent type, the father station M determines that the re-closing operation has failed in view of the fact that the closing of the switch SW2 is made in accordance with the command from the father station M and that the father station M has received the signal 31 or 41 from the son station K directly after the closing of the switch SW2. Thus, the father station M gives a command to open the switch SW2 directly.

Figure 5:
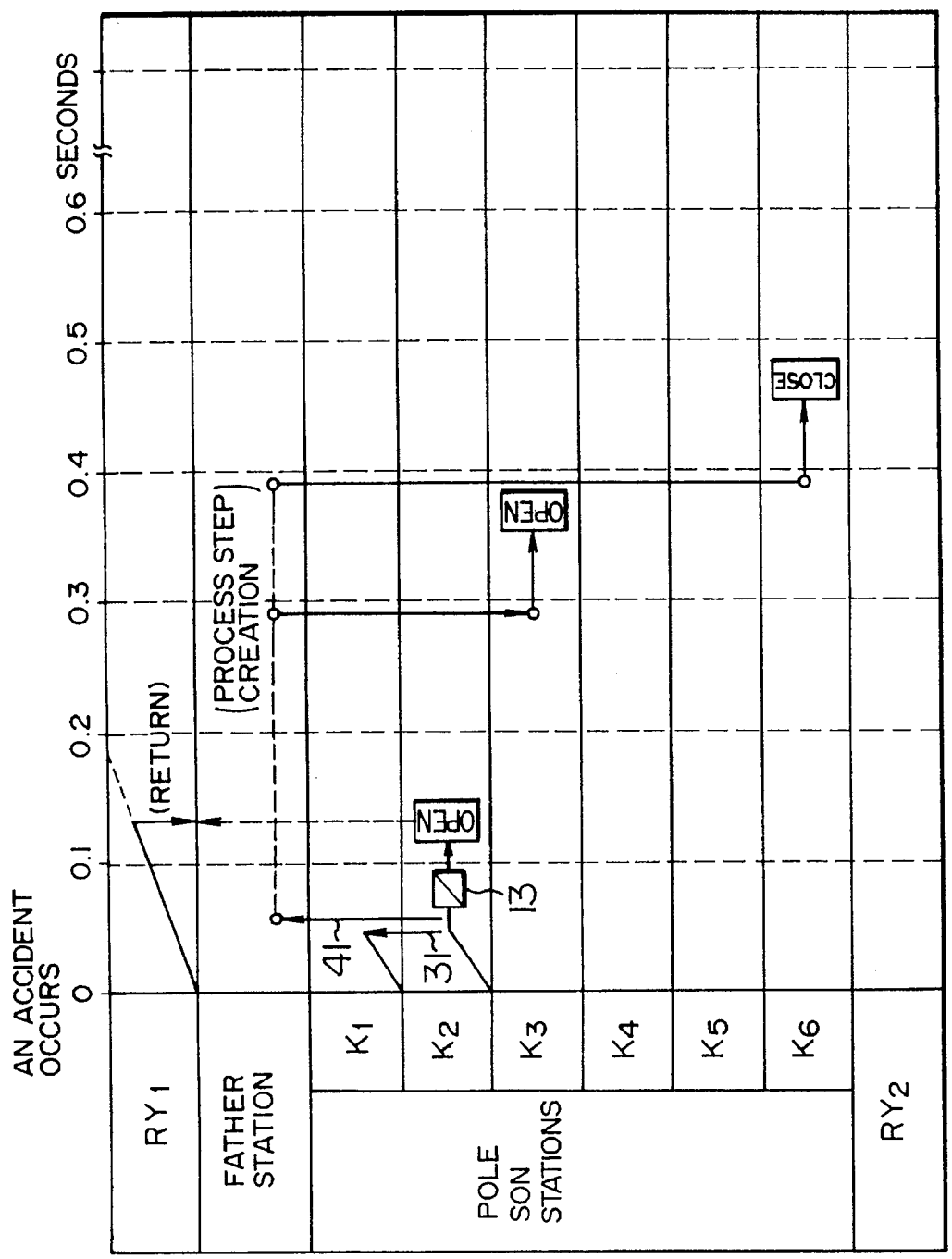
FIG. 5 is a timing chart indicative of the whole operation of the inventive system.
Figure 6:
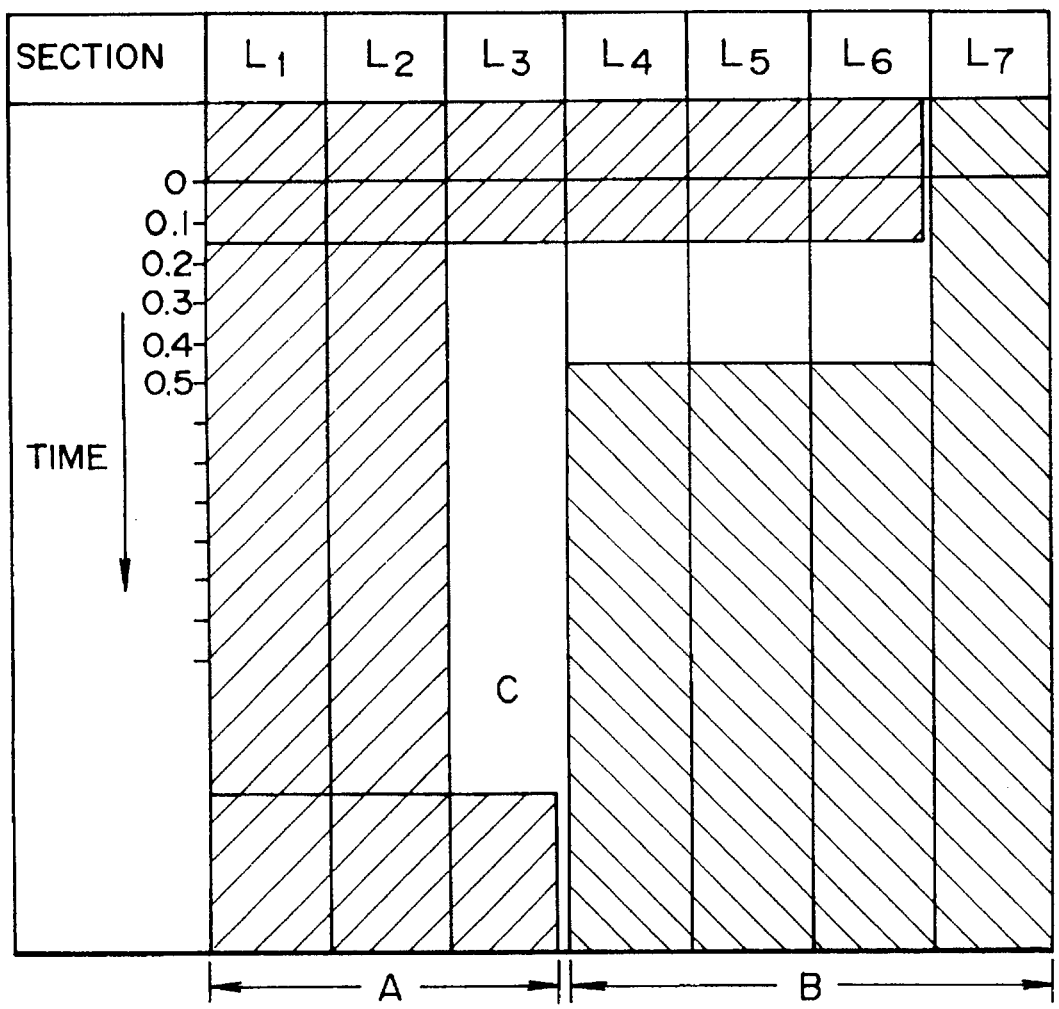
FIG. 6 shows a time series power impression state of power distribution sections at a recoverable accident used for explanation of the present invention.

The present invention has been above described mainly with respect to the operation of the device of FIG. 3. FIG. 5 shows the delivery/receipt of time series signals between the farther station M and the son stations K of the inventive device. FIG. 6 shows the time series supply of power to the respective distribution sections in the case of a recoverable accident. In FIG. 6, a left downward inclined hatched section A denotes a distribution section supplied with power from the BUS1, while a right downward inclined hatched section B denotes a distribution section supplied with power from the BUS2. A blank area shows a power stoppage section C. Since what is meant by FIGS. 5 and 6 will easily be understood by those skilled in the art from the above description, its further description will be omitted.

While in the above embodiment the operations of the device including the closing of the tie point, the opening of a son station K which has detected an accident, and the opening of son stations on the load side of the son station K which has detected the accident are performed sequentially in accordance with commands from the father station M, these operations may be performed among the son stations K without relying on the father station M. For example, the son station K which has detected an accident may report that fact to another son station K such that the tie point station K and the adjacent son station K perform their predetermined operations within corresponding predetermined time limits. Preferably, the father station M should command execution of such operations beforehand. This implies that if the system structure is determined, the operative procedures of a son station K are determined and hence that the son station K automatically performs the above operations including the closing of the tie point, the opening of the son station K which has detected the accident, and the opening of the son stations on the load side of the son station K which has detected the accident without communicating with the father station M, as in the previously-described embodiment of the present invention. This increases the operative speed of the device advantageously. In this case, however, the device cannot change the system structure, so that a change of the system should be made by causing the father station M to command the son station K to change the process steps.

According to the present invention, the power stoppage sections and time are minimized also in a short circuit. While in FIG. 6 the power stoppage time of the sections L1, L2 was about 30–60 seconds in the conventional device, it is 0 seconds in the present invention. While the power stoppage time of the sections L4–L6 was conventionally more than scores of minutes due to the operator's recovering work, it is about 250 milliseconds according to the present invention and hence the power stoppage sections and time are minimized.

What is claimed is:

1. A power stoppage minimizing system for a distribution line, comprising:

first and second distribution lines each connected through a circuit breaker to a corresponding bus and having a plurality of switches;

a normally open tie point switchgear provided between adjacent ends of said first and second distribution lines;

a protective relay for opening the circuit breaker a fixed time after the occurrence of a short circuit on the first distribution line;

communicating means for transmitting signals among said plurality of switches; and a father station for transmitting the signals to said plurality of switches by means of said communicating means, wherein said switchgear includes:

means for transmitting an overcurrent signal to other switchgears at a power supply side of the distribution line by means of said communicating means, when the overcurrent signal on the distribution line is detected, means for inputting the overcurrent signal indicating that the overcurrent from the switchgear at a load side on the distribution line is detected, and opening means for outputting a signal to open a personal switch within the fixed time on the conditions that the overcurrent signal is transmitted by the overcurrent signal transmitting means and that no overcurrent is inputted from the switchgear at the load side by the overcurrent signal inputting means, and said father station includes:

opening command outputting means for giving a command for opening the switch to the switchgear on the side of the load from the position of the switchgear operated by said opening means, and switch closing command outputting means for giving a closing command of the switch to the tie point switchgear.

2. A power stoppage minimizing system for a distribution line according to claim 1, wherein said father station inputs the detected overcurrent signal from said plurality of switches and locates the position of a short circuit in the distribution line.

3. A power stoppage minimizing system for a distribution line according to claim 1, wherein said father station outputs a command for closing the switch against the switchgear opening the switch.

4. A power stoppage minimizing system according to claim 1, wherein each of the switches has the function of detecting a short circuit, sending a signal indicative of the detection of the short circuit through a communication line, and opening that switch when same detects the short circuit and receives no signal indicative of the detection of the short circuit from the side of the load, or in accordance with a command from the father station.

* * * * *